NARROW BAND AUDIO FREQUENCY FILTERING SYSTEM
Filed June 14, 1961
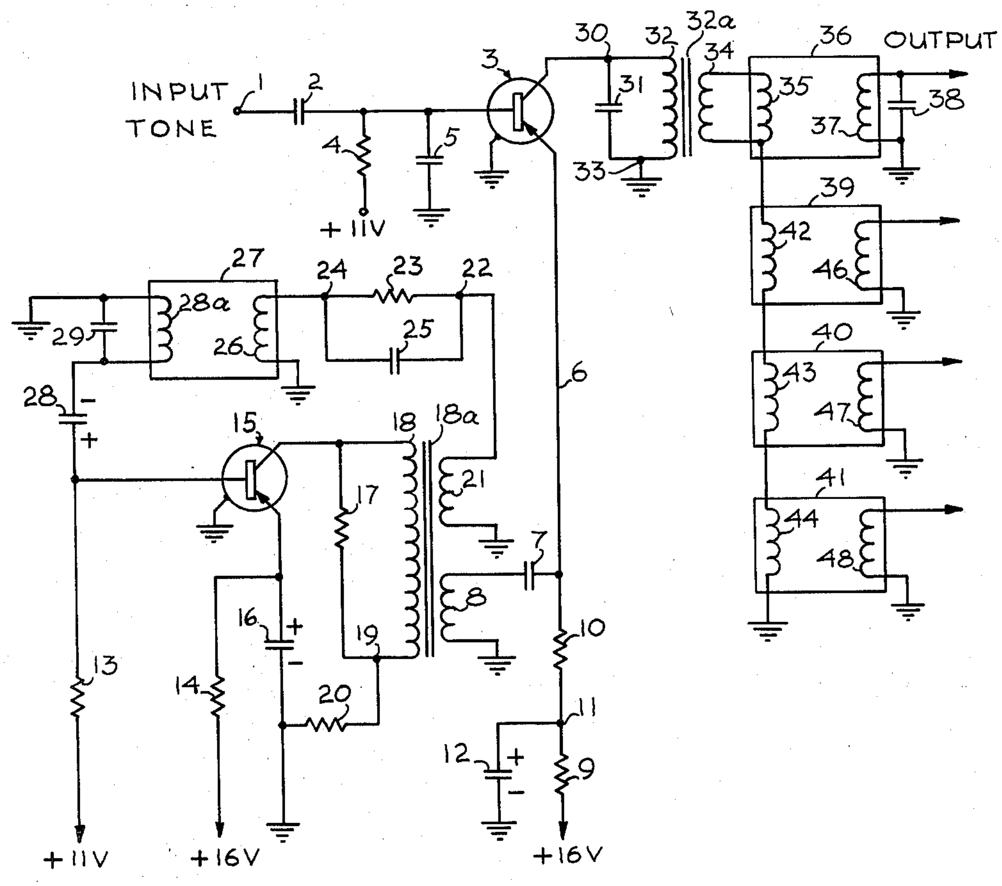
JOSEPH L. CZUBIAK
INVENTOR.
BY John L Jackson
ATTORNEY United States Patent Office 3,159,791 Patented Dec. 1, 1964

3,159,791
NARROW BAND AUDIO FREQUENCY FILTERING SYSTEM

Joseph L. Czubiak, Canoga Park, Calif., assignor, by mesne assignments, to The Bunker-Ramo Corporation, Stamford, Conn., a corporation of Delaware
Filed June 14, 1961, Ser. No. 117,085
7 Claims. (Cl. 325—489)

This invention relates to audio frequency filtering systems in general and more particularly to a very narrow band-pass filtering system which is extremely stable over a broad temperature range.

Often, a need arises for an extremely narrow band-pass filtering system for use in the audio frequencies which, while small and compact, is extremely stable over a wide temperature range. One such example is in missile flight safety operations where severe environmental conditions are encountered by the command destruct portion of the missile. Normally, safety mechanisms or destruct devices are activated by a ground emitted audio modulated R-F carrier. Obviously, any electronic unit carried by the missile must be small and compact and must be extremely stable from a temperature consideration due to the wide range of temperatures encountered. Likewise the system must be extremely reliable and therefore must have a high Q or good noise rejection so as to provide high signal to noise ratios in the presence of unwanted signals and noise.

It is quite difficult to build an extremely narrow band-pass filtering system for use at the audio frequencies in an operational environment where wide temperature ranges are present since a change in temperature tends to cause a corresponding change in the center frequency of the filtering system and, if the filter itself has an extremely narrow band pass, it will tend to rapidly drift away from the desired frequency. L-C filtering systems have been devised and, in fact, have been utilized by applicant in an effort to provide a temperature stable, narrow band-pass filtering system for use at the audio frequencies. However, while temperature compensation can be provided to hold the center frequency of the filter relatively constant, the relatively large size and high weight of the L-C filter and temperature compensating network make it undesirable for use in a missile safety or destruct system.

Ideally then, a filtering system for use at the audio frequencies in a missile destruct system should be small and compact, lightweight, relatively stable over a wide temperature range and have a narrow band pass. It is, therefore, an object of the present invention to provide a filtering system for use at the audio frequencies which has an extremely narrow band pass.

It is another object of the present invention to provide a filtering system for use at the audio frequencies the center frequency of which is extremely stable over a wide temperature range.

It is another object of the present invention to provide a novel filtering system for use at the audio frequencies which is small and compact and relatively inexpensive to manufacture.

It is another object of the present invention to provide a novel method of providing temperature compensation for an audio frequency filtering system.

It is another object of the present invention to provide a filtering system for use at the audio frequencies which is capable of simultaneously filtering a plurality of input tones.

Further objects and advantages of the present invention will become apparent to one skilled in the art from a consideration of the following detailed description when read in light of the accompanying drawing, which is a schematic diagram of a filtering system constructed in accordance with the invention.

Briefly, the audio tone to be filtered is heterodyned with a local oscillator signal having a magnetostriction resonance filter as a frequency control element to produce a sum frequency which is filtered through a second magnetostriction resonance filter which has a center frequency equal to the sum of the local oscillator signal and the tone and which has a temperature versus frequency characteristic substantially identical to that of the frequency control filter of the local oscillator. A novel temperature sensitive R-L-C phase shift network has also been provided to compensate for any frequency errors which arise due to the difference in operating frequencies of the two magnetostriction filters.

Applicant recognized that, while it is possible to provide a temperature stable filtering system for use at audio frequencies, any such system would be relatively expensive as well as bulky. Applicant therefore conceived the idea of heterodyning the audio tone to be identified with a signal from a local oscillator to provide a sum frequency which could be readily filtered by a relatively small and inexpensive filter.

One problem arose, however, which was due to the wide temperature ranges encountered. It was found that, when the filtering system was subjected to a wide temperature range, the center frequency of each of the filters tended to change and, since each filter had an extremely narrow band pass, the amplitude of the output signals delivered by each filter became an undesirable function of temperature. Thus, some sort of temperature compensation had to be provided to assure that environmental temperature changes would have negligible effect on the over-all performance of the system.

The figure is a schematic illustration of the novel filtering system which will hereinafter be described more fully in detail. The input to the filtering system is along line 1 through capacitor 2 to the base of transistor 3. A positive potential of, for instance, +11 volts is applied through resistor 4 to the base of transistor 3 while, in addition, a trap capacitor 5 has one side tied to the base of transistor 3 and its other side grounded. The emitter of transistor 3 is connected along line 6 to one side of blocking capacitor 7, the other side of which is connected to one side of pick-up winding 8, the other side of which is grounded. A positive potential of, for instance, +16 volts is applied through bias resistor 9 and unbypassed resistor 10 to the emitter of transistor 3. One side of capacitor 12 is connected to the junction 11 between resistors 9 and 10 while its other side is grounded.

A positive potential which may be, for instance, +11 volts is applied through bias resistor 13 to the base of transistor 15. A positive potential which may, for instance, be +16 volts is applied through bias resistor 14 to the emitter of transistor 15. One side of bypass capacitor 16 is connected to the emitter of transistor 15 while the other side thereof is grounded. The collector of transistor 15 is connected to one side of load resistor 17 and one side of primary winding 18 of transformer 18a. The other side of load resistor 17 and the other side of winding 18 are connected to junction 19 which is grounded through load resistor 20. A feedback winding 21 has one side connected to ground while its other side is connected to junction 22. One side of resistor 23 is connected to junction 22 while the other side thereof is connected to junction 24. Similarly, one side of capacitor 25 is connected to junction 22 while the other side thereof is connected to junction 24. Junction 24 is connected to the primary coil 26 of filter 27 while the other side of primary coil 26 is grounded. One side of secondary coil 28a of filter 27 is grounded while the other side thereof is connected to one side of blocking capacitor 28, the other side of which is connected to the base of transistor 15. A tuning capacitor 29 is connected across secondary coil 28a of filter 27.

The collector of transistor 3 is connected to junction 30 which in turn is connected to one side of tuning capacitor 31 and one side of primary winding 32 of transformer 32a. The other side of tuning capacitor 31 and the other side of primary winding 32 are connected through junction 33 to ground. Secondary winding 34 is connected to primary winding 35 of filter 36. The output of the circuit is taken across secondary winding 37 which has a tuning capacitor 38 connected across it. Any number of output filters 39 through 41, as will hereinafter become apparent, can be connected with their primary coils 42 through 44 connected to primary coil 35 of filter 36, in order to discriminate between a plurality of conditionally occurring input signals. The output of these serially connected output filters 39 through 41 is, of course, taken across secondary coils 46 through 48 respectively.

In operation an audio input tone of, for example, 1 kc. is applied along line 1 to the base of transistor 3. As will hereinafter become apparent, transistor 3, capacitor 31 and primary winding 32 comprise a mixing circuit.

Capacitor 2 is merely a coupling capacitor to provide coupling between the filtering system and the previous stage while resistor 4 is a bias resistor for providing a bias to the base of transistor 3. Capacitor 5 is a trap capacitor, which acts to effectively trap any local oscillator signal which is fed back from the emitter to the base of transistor 3 but which does not attenuate the input tone.

Resistor 13 is a bias resistor for providing a bias to the base of the local oscillator transistor 15. Capacitor 28 is a blocking capacitor which prevents the bias potential applied to transistor 15 from being grounded out through winding 28a. Resistor 14 is a bias resistor for providing a bias to the emitter of transistor 15, while capacitor 16 is a bypass capacitor. Resistor 17 is connected across primary winding 18 to load the transformer 18a to lower the Q of the circuit so that any change in the inductance of the transformer 18a does not effect any substantial change in the frequency of oscillation. Primary winding 18, pick-up winding 8 and feedback winding 21 are all wound on a toroidal core. Resistor 9 is a bias resistor for providing a bias to the emitter of transistor 3, while capacitor 12 is a bypass capacitor. Resistor 10 is an unbypassed resistor in the emitter circuit of transistor 3 which tends to increase the input impedance of transistor 3 in that it provides degeneration in the emitter circuit. Resistor 23, the resistance of which varies in accordance with the temperature, as will hereinafter be more fully described, capacitor 25 and primary winding 26 comprise a phase shift network. Capacitor 29 is a tuning capacitor which tunes the output of secondary coil 28a of filter 27.

Filter 27, which is in the feedback loop of the local oscillator circuit, is a magnetostriction resonance filter which has an operating frequency of, for instance, 45 kc. with a 3 db band pass of 3 c.p.s. As is well known, the resonant frequency of the filter is adjusted by removing a small amount of material from the rod (not shown). If the material is removed near the nodes of the filter, the frequency is lowered while, if the material is removed near the anti-nodes, the frequency is increased. This procedure can result in tuning accuracies to within one-tenth of a cycle. Thus, filter 27 is the frequency-determining element of the local oscillator.

The essence of applicant's invention is the utilization of at least two magnetostrictive frequency selective means, in this case, filters 27 and 36. One is the frequency control element in the local oscillator and the other is the output filter. The magnetostriction filters 27 and 36 are chosen to be nearly identical to each other and have the same temperature stability over an expected operational temperature range. The two filters 27 and 36 are subjected to the same environmental conditions and thus since they operate at very nearly the same frequency and have the same temperature coefficient, they drift in the same direction at essentially the same rate and thus may be said to "track" each other. In accordance with the hereindescribed invention, an input tone of, for instance, 1 kc. is applied to the base of transistor 3. This input tone is heterodyned with the local oscillator signal which is, for instance, 45 kc. to provide a sum frequency. The output magnetostriction filter 36 is tuned to a particular center frequency which is the sum of the input tone frequency plus the local oscillator frequency and has a high rejection to any other frequency such as the local oscillator signal which also appears in the collector circuit of transistor 3.

Through the anticipated temperature range of the two magnetostriction filters they will very nearly track each other in frequency since both have the same temperature coefficients. There is, however, a temperature instability which arises due to the fact that the filters are operating at different center frequencies since the center frequency of a magnetostriction filter over a given temperature range tends to change by an amount proportional to its center frequency. This instability factor applies only to the difference between the local oscillator and output filter frequencies, i.e., the audio tone frequency. Thus, the lower the tone the better the tracking. However, the closer the sum frequency is to the local oscillator frequency the more difficult it is to reject the local oscillator signal.

For a tone frequency of 1 kc. over the temperature range −10° C. to +80° C. ($\Delta T = 90°$ C.) in accordance with $$\Delta f = \frac{\beta \Delta T}{f a} \qquad \text{(Eq. I)}$$

where $\beta$=temperature coefficient of magnetostriction filters =8 p.p.m./° C. and $f_a$=audio tone frequency, the possible tracking error would be in the order of .72 cycle. In many applications this error would be insignificant. That is to say that if the frequency shift is of such a magnitude that it is considerably smaller than the band pass width of the filter, then the circuit can operate satisfactorily as is. However, in extremely narrow band-pass filters of, for instance, 3 cycles a .72 cycle error represents nearly a 25% error. Therefore, applicant devised an additional temperature compensating network to provide compensation for the error introduced due to the fact that the respective magnetostriction filters operate at different center frequencies. Thus, for extremely narrow band applications, applicant has provided a phase shift network comprising capacitor 25, resistor 23 and primary winding 26 of filter 27 for more precise frequency tracking.

Since the local oscillator operates at a lower frequency, the phase shift circuit must advance the phase angle to effect an increase in frequency if the oscillator is to change in frequency over a given temperature range by the same amount as the 46.0 kc. output filter. Assume an ambient temperature of 25° C. and a temperature range from +80° C. to −10° C. (subscript 1 hereafter denotes condition −10° C., subscript 2 denotes +80° C. and subscript 0 denotes +25° C. or ambient). The amount of error ($\Delta F'$) without compensation would be $$\Delta f_1' = \frac{\beta \Delta T_1}{f_t}$$

$$\Delta T_1 = (80-25) = 55° \text{ C.} \quad \text{(Eq. II)}$$

$$\Delta T_2 = (25-(-)10 = 35° \text{ C.}$$

$$\Delta f_1' = \frac{8\times 55}{1\times 10^3} = 0.444 \text{ cycle}$$

$$\Delta f_2' = \frac{\beta \Delta T_2}{f_t}$$

$$\Delta f_2' = \frac{8\times 35}{1\times 10^3} = .280 \text{ cycle}$$

where $f_t$=tone $\beta$=temperature coefficient of filters=8 p.p.m./° C.

The purpose of the phase shift circuit is to minimize these errors. The network consists of a series combination of resistance and reactance. The resistor 23 and capacitor 25 are provided in parallel at the input to filter 27. The inductance is provided by the input coil 26 of filter 27. The angle of lead is given by $$\phi = 2 \tan^{-1} \omega RC \text{ also } L/\omega C = 2\omega L \quad \text{(Eq. III)}$$

(Ref. No. 1 Radiation Laboratory Series, vol. 19, page 140)

Since the purpose of the network is to provide a change in phase corresponding to a change in temperature, by way of example a solid state temperature sensing resistor is utilized as the R in the circuit. This resistor has a temperature coefficient of +.7% per degree C. This yields the following resistance values:

$R_0$=resistance at 25° C.=470 ohms
$R_1$=resistance at −10° C.=355 ohms
$R_2$=resistance at +80° C.=651 ohms Assume that $$C_1 \cong C_2 \cong C_0 = .015\ \mu\text{fd.}$$

and $$\omega_0 \cong \omega_1 \cong \omega_2 = 28.3\times 10^4$$

The changes in phase angle at −10° C. from ambient is given by $$\Delta\phi_1 = \phi_1 = \phi_0 = 2 \tan^{-1} \omega R_1 C - 2 \tan^{-1} \omega R_0 C \quad \text{(Eq. IV)}$$

$$= 2 \tan^{-1} 28.3\times 10^4 \times 3.55\times 10^2 \times 1.5\times 10^{-8} - 2 \tan^{-1} 28.3\times 10^4 \times 4.7\times 10^2 \times 1.5\times 10^{-8}$$

$$= -13° 46'$$

and the change in phase angle at +80° C. from ambient is given by $$\Delta\phi_2 = \phi_2 - \phi_0 = 2 \tan^{-1} \omega R_2 C - 2 \tan^{-1} \omega R_0 C \quad \text{(Eq. V)}$$

$$= 2 \tan^{-1} 28.3\times 10^4 \times 6.51\times 10^2 \times 1.5\times 10^{-8}$$

$$= 2 \tan^{-1} 28.3\times 10^4 \times 4.7\times 10^2 \times 1.5\times 10^{-8}$$

$$= +13° 42'$$

The phase shift of a single tuned circuit is related to frequency by the equation $$\phi = n \tan^{-1}\left(2Q\frac{\Delta f}{f_0}\right) \quad \text{(Eq. VI)}$$

where $n$=number of tuned circuits and
$f_0$=center frequency $$Q = \frac{f_0}{BW_{3\text{db}}}$$

(Ref. No. 2, Reference Data for Radio Engineers, 4th Ed. ITT Corp., page 242)

Thus $$Q = \frac{f_0}{BW_{3\text{db}}} \text{ (Resonant frequency)} = \frac{45\times 10^3}{3} = 15\times 10_3 \quad \text{(Eq. VII)}$$

in our case Eq. VI can be expressed as $$\Delta\phi_1 = \tan^{-1}\frac{2Q\Delta f_1}{f_0}$$

Assume $$f_0 \cong f_1 \cong f_2$$

$$Q_0 \cong Q_1 \cong Q_2$$

from (IV)

$$\tan \Delta\phi_1 = \tan 13° 46^1 = .245 \quad \text{(Eq. VIII)}$$

$$\therefore \Delta\phi_1 = \tan^{-1} .245$$

$$\therefore 245 = \frac{2\phi\Delta f_1}{f_0} \quad \text{(Eq. IX)}$$

solving for $\Delta f_1$ (amount of frequency shift due to phase shift network)

$$\Delta f_1 = \frac{f_0\times .245}{2Q} = \frac{45\times 10^3\times .245}{2\times 15\times 10^3} = .368 \text{ cycles} \quad \text{(Eq. X)}$$

similarly $$\Delta f_2 = \frac{f_0\times .244}{2\times 15\times 10^3} = .366 \text{ cycles} \quad \text{(Eq. XI)}$$

Since the tuned filter element is subjected to an external negative phase shift as in (IV), the center frequency of the filter is "pulled" and it must undergo a positive phase change to maintain the phase necessary for oscillations.

For $f>f_0$ $\phi$ is negative, while

For $f<f_0$ $\phi$ is positive (Ref. 2, page 244). Therefore, in case (IV) the frequency is decreased. In (V) the reverse is true. Comparing this to the previously calculated uncompensated error

| | | |
|---|---|---|
| $\Delta f_1'$ (uncompensated) | =.444 | $\Delta f_2'$=.280 |
| $\Delta f_1'$ (compensated) | =.368 | $\Delta f_2$ =.366 |
| | .078 (net error) in cycles | .086 (net error) in cycles |

In the above-described manner I have provided a filtering system for use at the audio frequencies which is small, compact and lightweight. In addition, I have provided a filtering system for use at the audio frequencies which is highly stable over a wide temperature range and which has a narrow band pass to provide extremely good signal to noise ratios.

I have, in the present invention, taught a method of heterodyning an audio tone up in frequency to provide a signal which is more readily filtered than audio frequencies. In addition, I have provided a tracking system whereby a magnetostriction filter is utilized as the output filter for the heterodyned signal. Moreover, for those applications which require extremely good signal to noise ratio and consequently extremely narrow band pass, I have provided an additional temperature compensating network to provide for any discrepancies in the frequency tracking of the two magnetostriction filters which may arise due to their different operating frequencies.

While I have described a temperature compensating network of the R-L-C type which utilizes a temperature sensitive resistor having a positive temperature coefficient, it should be quite obvious that with minor modifications a temperature sensitive resistor having a negative temperature coefficient could also be utilized. Similarly, while I have provided a temperature sensitive resistor, with minor modifications a thermister circuit could be provided to vary the phase angle phase shift in the local oscillator to provide precise frequency tracking. Again, while in the present application, I have explained a method of low side injection wherein the local oscillator frequency is below that of the output filter, it is simply a matter of choice and high side injection where the local oscillator frequency is above that of the output filter could just as well be used.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A temperature stable extremely narrow band-pass filtering system for use at the audio frequencies comprising: an electronic mixer, a local oscillator coupled to said mixer, first and second temperature sensitive frequency control means in the feedback circuit of said local oscillator, said first temperature sensitive control means comprising a magnetostriction resonance filter the center frequency of which varies a predetermined amount with a given change in temperature, said second temperature sensitive frequency control means comprising an inductance in series with a capacitor and temperature sensitive resistance connected in parallel, and a magnetostriction resonance output filter for each tone to be identified, the center frequency of each magnetostriction resonance filter varying with a given change in temperature substantially the same amount as said first temperature sensitive frequency control means, each of said magnetostriction resonance output filters being coupled to said electronic mixer.

2. A temperature stable extremely narrow band-pass filtering system for use at the audio frequencies comprising: an electronic mixer, a local oscillator, said local oscillator comprising a PNP transistor, bias means connected to the base of said PNP transistor, bias means connected to the emitter of said PNP transistor, a first transformer having a primary and first and second secondary windings, said primary winding connected between the collector of said PNP transistor and ground, said first secondary winding electrically connected to a capacitor and temperature sensitive resistance means connected in parallel, said capacitor and said temperature sensitive resistance means connected to the input of a magnetostriction resonance filter, the output of said magnetostriction output resonance filter being coupled to the base of said PNP transistor, said second secondary winding connected to said mixer, and a magnetostriction-resonance output filter inductively coupled to said mixer for each tone to be filtered.

3. A temperature stable extremely narrow band-pass filtering system for use at the audio frequencies comprising: an electronic mixer comprising a first PNP transistor, bias means connected to the base of said first PNP transistor, bias means connected to the emitter of said first PNP transistor, said emitter of said first PNP transistor being also connected to the second secondary winding of a first transformer having a primary winding and first and second secondary windings, the collector of said first PNP transistor connected to the primary winding of a second transformer having primary and secondary windings, a local oscillator the output of which is fed into the primary winding of said first transformer comprising a second PNP transistor, bias means connected to the base of said second PNP transistor, bias means connected to the emitter of said second PNP transistor, the primary winding of said first transformer connected between the collector of said second PNP transistor and ground, said first secondary winding of said second transformer connected between ground and a temperature sensitive resistance means and first capacitance means connected in parallel, a first magnetostriction resonance filtering means having primary and secondary coils, said primary coil connected between ground and said temperature sensitive resistance means and said first capacitance means, the secondary coil of said first magnetostriction resonance filtering means connected between ground and the base of said second PNP transistor, and a second magnetostriction resonance filtering means connected to the secondary winding of said first transformer of each tone to be filtered.

4. A temperature stable extremely narrow band-pass filtering system for use at the audio frequencies comprising: an electronic mixer, said electronic mixer comprising a first PNP transistor, a coupling capacitor and bias means connected to the base of said first PNP transistor, a first transformer having a primary winding and first and second secondary windings, bias means and said second secondary winding of said first transformer connected to the emitter of said first PNP transistor, a local oscillator comprising a second PNP transistor, bias means connected to the base of said second PNP transistor, bias means connected to the emitter of said second PNP transistor, inductive and resistive load means connected to the collector, of said second PNP transistor, said inductive load means comprising the primary winding of said first transformer, said first secondary winding of said first transformer connected to the emitter of said first PNP transistor, said second secondary winding of said first transformer connected to a temperature sensitive phase shift network, a first magnetostriction resonance filter having primary and secondary coils, said primary coil of said first magnetostriction resonance filter connected to said temperature sensitive phase shift network, a first tuning capacitor across the secondary winding of said secondary coil of said first magnetostriction resonance filter, said secondary coil of said first magnetostriction resonance filter being coupled through a capacitance means to the base of said second PNP transistor, a second transformer having primary and secondary windings, the primary winding of said second transformer and a second tuning capacitor connected in parallel between ground and the collector of said first PNP transistor, a second magnetostriction resonance filter for each tone to be filtered, each of said magnetostriction resonance filters having primary and secondary coils, the secondary winding of said second transformer connected to the primary coil of each of said second magnetostriction resonance filters, and a third tuning capacitor connected across each of said secondary coils of each said second magnetostriction resonance filters.

5. A temperature stable filtering system for relatively low frequency input signals of a plurality of different frequencies comprising: a local oscillator for providing a local signal of a frequency substantially higher than the frequencies of said input signals and including magnetostriction frequency control means having a known frequency versus temperature characteristic, mixing means for heterodyning said input signals and said local signal to provide a plurality of output signals of frequencies substantially higher than said input signals, and a plurality of magnetostriction output filters connected to receive and filter said output signals and having frequency versus temperature characteristics substantially identical to that of said frequency control means, whereby the center frequencies of said output filters vary with a given change in temperature substantially the same amount as the frequency of said local signal.

6. A temperature stable filtering system for relatively low frequency input signals of a plurality of different frequencies comprising: a local oscillator for providing a local signal of a frequency substantially higher than the frequencies of said input signals and including magnetostriction frequency control means having a known frequency versus temperature characteristic, mixing means for heterodyning said input signals and said local signal to provide a plurality of output signals of frequencies substantially higher than said input signals, and a plurality of magnetostriction output filters connected to receive said output signals and provide a plurality of discrete filtered signals of different frequencies corresponding to different ones of said plurality of input signals, said magnetostriction output filters having center frequencies substantially the same as the frequencies of said output signals and having frequency versus temperature characteristics substantially identical to that of said frequency control means, whereby the center frequencies of said output filters vary with a given change in temperature substantially the same amount as the frequency of said local signal.

7. A temperature compensated filtering system useful in discriminating between a plurality of different conditionally occurring input signals of respectively different frequencies comprising: mixing means for receiving said input signals and heterodyning each of said signals with a local oscillator signal of a frequency substantially higher than the frequency of any one of said input signals, local oscillator means coupled to said mixing means for applying a local oscillator signal thereto, magnetostrictive frequency selective means included in said local oscillator means for controlling the frequency of said local oscillator signal, said magnetostrictive frequency selective means having known frequency versus temperature characteristics, a plurality of output filters coupled to said mixing means each for developing a different one of a corresponding plurality of output signals in response to the occurrence of a different one of said input signals, and magnetostrictive frequency selective means included in said output filters for controlling the center frequencies thereof and having frequency versus temperature characteristics substantially identical to that of said first-mentioned magnetostrictive frequency selective means whereby the center frequency of each of said output filters varies with a given change in temperature substantially the same amount as the frequency of said local oscillator signal.

References Cited in the file of this patent

UNITED STATES PATENTS

| | | |
|---|---|---|
| 1,811,128 | Harrison | June 23, 1931 |
| 2,708,237 | Roberts | May 10, 1955 |
| 2,941,158 | Pintell | June 14, 1960 |